United States Patent [19]

Memon et al.

[11] Patent Number: 5,599,860
[45] Date of Patent: Feb. 4, 1997

[54] IMPACT MODIFIED POLYACETAL COMPOSITIONS

[76] Inventors: Nazir A. Memon, 1001 Meridian Way, Yardley, Pa. 19067; Richard H. Weese, 123 Glenwood Dr., Washington Crossing, Pa. 18977; Ursula E. Ziegler, Henry-Moisand-Strabe 40, D-6500 Mainz 43, Germany

[21] Appl. No.: 474,030

[22] Filed: Jun. 7, 1995

Related U.S. Application Data

[63] Continuation-in-part of Ser. No. 196,743, Feb. 15, 1994, abandoned.

[51] Int. Cl.[6] .............................. C08K 5/526; C08K 5/36; C08K 5/13
[52] U.S. Cl. ..................... 524/151; 524/153; 524/302; 524/304; 524/305; 524/330; 524/417; 524/504
[58] Field of Search ................................. 524/151, 153, 524/304, 302, 305, 330, 417, 504

[56] References Cited

U.S. PATENT DOCUMENTS

| | | | |
|---|---|---|---|
| 3,027,352 | 3/1962 | Walling et al. | 528/241 |
| 3,170,896 | 2/1965 | Wagner et al. | 525/400 |
| 3,479,319 | 11/1969 | Hergenrother | 260/457 |
| 3,527,730 | 9/1970 | Coulson et al. | 260/457 |
| 3,749,755 | 7/1973 | Bronstert et al. | 525/64 |
| 4,017,558 | 4/1977 | Schmidt et al. | 525/91 |
| 4,424,307 | 1/1984 | DiEdwardo et al. | 525/154 |
| 4,639,488 | 1/1987 | Schuette et al. | 524/456 |
| 4,877,821 | 10/1989 | Hall et al. | 523/351 |
| 5,008,313 | 4/1991 | Kishida et al. | 524/120 |
| 5,039,741 | 8/1991 | Burg et al. | 525/64 |
| 5,047,471 | 9/1991 | Burg et al. | 525/66 |
| 5,164,434 | 11/1992 | Liwak et al. | 524/100 |
| 5,183,858 | 2/1993 | Sasaki et al. | 525/308 |
| 5,266,633 | 11/1993 | Burg et al. | 525/64 |

FOREIGN PATENT DOCUMENTS 1017244  1/1966  United Kingdom .

*Primary Examiner*—Ana Woodward
*Attorney, Agent, or Firm*—Roger K. Graham, Patent Agent

[57] ABSTRACT

The invention relates to improved polyacetal compositions composed of polyoxymethylene (component A) and a stabilized MBS core shell graft copolymer (component B) formed from a rubber-elastic core based on polybutadiene, and a hard graft shell.

The stabilized MBS core shell graft copolymer (component B) contains a special stabilization formulation of at least one hindered phenol, a phosphite, a sulfide, and a pH buffer system.

The shaped articles produced from these mixtures are particularly distinguished by an excellent low-temperature impact strength and a good heat aging performance.

16 Claims, No Drawings

IMPACT MODIFIED POLYACETAL COMPOSITIONS

This application is a continuation-in-part of U.S. application Ser. No. 08/196,743, filed Feb. 15, 1994 now abandoned

FIELD OF THE INVENTION

Polyacetal compositions, which are also referred to as polyoxymethylene (POM) compositions, are generally understood to include compositions based on homopolymers of formaldehyde or of cyclic oligomers of formaldehyde, for example, trioxane, the terminal groups of which are end-capped by esterification or etherification, as well as copolymers of formaldehyde or of cyclic oligomers of formaldehyde, with oxyalkylene groups which have at least two adjacent carbon atoms in the main chain. The proportion of the comonomers can be up to 20 percent (%) by weight.

Polyacetal molding compositions have been in commercial use for many years. Because of their excellent mechanical properties such as high stiffness, hardness and strength, creep resistance and fatigue resistance as well as high elastic recovery and their good resistance to many chemicals, they have applications in a wide variety of end uses, particularly in the engineering field, for example, in automotive applications or in household applications, for machine parts or in the electrical or electronic industries. However for a number of potential applications the impact resistance and flexibility is too low.

The present invention relates to molding compositions of polyoxymethylene (component A) and a stabilized MBS (methacrylate-butadiene-styrene) core shell graft copolymer (component B) in which the particles have been formed from a rubber-elastic core based on polybutadiene and a hard graft shell. Component B contains a special stabilization formulation of at least one hindered phenol, a phosphite, an organic sulfide, and a pH buffer system, such as disodium hydrogen phosphate, trisodium phosphate, a mixture of disodium hydrogen phosphate and trisodium phosphate, or a mixture of sodium hydroxide and phosphoric acid.

The shaped articles produced from these mixtures are particularly distinguished by an excellent low-temperature impact strength and a good heat aging performance.

BACKGROUND OF THE INVENTION

A number of methods are known from the patent literature for improving the toughness properties of polyacetals, by incorporating crosslinked or uncrosslinked elastomers, in some cases also grafted elastomers. The following may be mentioned as examples: POM modified with polyurethanes (German Patent No. 1,193,240), POM modified with a graft copolymer prepared on an acrylic ester/butadiene basis (German Patent No. 1,964,156), POM modified with polybutadiene (U.S. Pat. No. 4,424,307) or POM modified with a polydiene/polyalkylene oxide block copolymer (German Patent No. 2 408 487). However these mixtures do not show sufficient low-temperature impact strength for many applications.

EP 156,285 and EP 181,541 describe mixtures of POM and core shell rubber-elastic graft copolymers in which the particles have been formed from a rubber-elastic core based on a polydiene and a hard graft shell with improved low-temperature impact resistance. The aging behavior of these mixtures at elevated temperatures however is not satisfactory, which limits their application for example for automotive parts. The object of the present invention was, therefore, to provide a toughened POM composition which, compared with known systems, possesses, at temperatures down to −40° C., considerably improved toughness properties, and at temperatures up to 100° C. good aging properties combined with a satisfactory thermostability in the melt at temperatures up to 230° C.

It has now been found that this object can be achieved, surprisingly, by employing a specially stabilized toughening component, namely a stabilized MBS core shell graft copolymer composed of a rubber-elastic polybutadiene core, one or more hard graft shells composed of polymers mainly formed from styrene, from methyl methacrylate or from mixtures thereof (amounts below 10% of other monomers such as ethyl acrylate, or crosslinking or graftlinking monomers, may also be formed into the polymers of the shell or shells), and a special stabilization formulation. The term "hard", as known to those skilled in impact modifier technology, means that the shell polymer is a glass at room temperature or above. The special stabilization formulation consists of at least one hindered phenol, a phosphite, a sulfide, and a pH buffer system.

In contrast, the addition of common stabilizers to a core shell graft copolymer either did not improve the heat aging properties to a satisfactory extent or the thermostability in the melt deteriorated to an unacceptable extent.

SUMMARY OF THE INVENTION

The invention relates to an improved POM composition comprising POM (component A) and 5–50% by weight, relative to the total mixture, of a stabilized core shell graft copolymer (component B) formed from a rubber-elastic core based on polybutadiene and a hard graft shell. Component B, in addition to the core shell graft copolymer, contains a special stabilization formulation of at least one hindered phenol, a phosphite, a sulfide, and a pH buffer system, such as disodium hydrogen phosphate, trisodium phosphate, a mixture of disodium hydrogen phosphate and trisodium phosphate, or a mixture of sodium hydroxide and phosphoric acid.

Finally, the invention relates to shaped articles produced from the improved POM composition of this type. The shaped articles produced from the improved POM composition are particularly distinguished by an excellent low-temperature impact strength and a good heat aging performance.

An essential characteristic of the improved POM composition according to the invention is component B, which contains a special stabilizer formulation of at least one hindered phenol, a phosphite, an organic sulfide, and a pH buffer system, such as disodium hydrogen phosphate, trisodium phosphate, a mixture of disodium hydrogen phosphate and trisodium phosphate, or a mixture of sodium hydroxide and phosphoric acid.

The improved polyacetal composition comprises polyoxymethylene (component A) and 5–50% by weight, relative to the total mixture, of:

(a) a stabilized MBS core shell graft copolymer (component B) formed from a rubber-elastic core comprising polybutadiene, a hard graft shell, and a stabilizer formulation composed of at least one hindered phenol, a phosphite, a sulfide and a pH buffer system, or (b) a combination of a sulfide, a MBS core shell graft copolymer containing one or more hindered phenols and a phosphite, and optionally, a pH buffer system, or (c) a combination of a sulfide, a phosphite, a MBS core shell graft copolymer containing one or more hindered phenols, and optionally, a pH buffer system, or (d) a combination of a sulfide, a MBS core shell graft copolymer containing one or more hindered phenols, a pH buffer system, and optionally, a phosphite.

DESCRIPTION OF THE INVENTION

The present invention relates to molding compositions of polyoxymethylene (component A) and a stabilized core shell graft copolymer (component B) formed from a rubber-elastic core based on polybutadiene and a hard graft shell. Component B also contains a special stabilization formulation. If appropriate or desired, a polymeric third component or fillers may also be present.

Component A: Polyoxymethylene

Component A, polyoxymethylene (POM), which is also referred to as polyacetal, may be an oxymethylene homopolymer, e.g. a homopolymer of formaldehyde or trioxane, the hemi-formal groups of which have been end-capped by acylation or etherification as disclosed, for example, in U.S. Pat. No. 3,170,896. Preferably, however, the acetal polymer is an oxymethylene copolymer prepared by copolymerizing trioxane with 0.1 to 20% by weight of a cyclic ether having at least two adjacent carbon atoms. Copolymers of this type are described in U.S. Pat. No. 3,027,352 of Walling et al. Such copolymers may be described as having at least one chain containing between about 80 and about 99.9% by weight oxymethylene (—O—CH$_2$—) units interspersed with between about 0.1 and 20% by weight of —O—R'-units wherein R' is a divalent radical containing at least two carbon atoms directly linked to each other and positioned in the chain between the two valences with any substituent in the R' radical being inert. Suitable comonomers are: a) cyclic ethers having 3, 4 or 5 ring members, and b) cyclic acetals other than trioxane having 5–11, preferably 5, 6, 7 or 8, ring members.

The preferred copolymers are those made up of oxymethylene and oxyethylene groups, such as copolymers of trioxane with dioxolane or with ethylene oxide, or those made up of oxymethylene and oxybutylene groups, such as copolymers of trioxane with butanediolformal.

Also contemplated as the acetal polymer are terpolymers prepared, for example, by reacting: a) trioxane and a cyclic ether or cyclic acetal, or b) trioxane and a cyclic ether and cyclic acetal, such as in the preparation of the oxymethylene copolymer, with a third monomer which is a bi-functional compound such as the diglycidyl ether of ethylene glycol, diglycidyl ether and diethers of 2 mols of glycidol and 1 mol formaldehyde, dioxane or trioxane, or diethers of 2 mols of glycidol and 1 mol formaldehyde, dioxane or trioxane, or diethers of 2 mols of glycidol and 1 mol of an aliphatic diol with 2 to 8 carbon atoms, preferably 2 to 4 carbon atoms, or a cycloaliphatic diol with 4 to 8 carbon atoms.

Examples of suitable bi-functional compounds include the diglycidyl ethers of ethylene glycol, 1,4-butanediol, 1,3-butanediol, cyclobutane-1,3-diol, 1,3-propane-diol, cyclohexane-1,4-diol and 2,2-dimethylcyclobutane-1,3-diol, with butanediol diglycidyl ethers being most preferred. The bi-functional compound may be used for example in the range of 0.1 to 10 percent based on the weight of the total monomers. The terpolymer may be prepared using the same methods known in the art for preparing the copolymers.

The values of reduced specific viscosity (RSV values) of the polyoxymethylene are, in general, 0.3–2.0 dl/g, preferably 0.5–1.5 dl/g (measured in butyrolactone, stabilized with 2% by weight of diphenylamine, at 140° C. in a concentration of 0.5 g/100 ml) and the melt flow index values (MFI 190/2.16) are in most cases between 0.02 and 50 g/min. The crystallite melting point of the polyoxymethylene is within the range from 140° to 180° C., preferably 150°–180° C.; its density is 1.38–1.45 g/ml, preferably 1.40–1.43 g/ml (measured as specified in DIN 53.479).

The POM components according to the invention can, if appropriate, also contain various additives, such as protective agents against thermal degradation of the POM, nucleating agents, antistatic agents, protective agents against degradation by ultra-violet lights, flame-retarding agents, strip agents, lubricants, plasticizers, pigments, dyestuffs, optical brighteners, processing aids and the like, the amount of which can be up to 50% by weight, relative to the total improved POM composition.

Suitable protective agents against thermal degradation of the POM, referred to in the parent application as "stabilizers of the polyacetal phase against the effect of heat" are in particular nitrogen-containing protective agents against thermal degradation of the POM like polyamides, amides of polybasic carboxylic acids, amidines, hydrazines, ureas or urethanes, and alkaline earth metal salts of aliphatic monobasic to tribasic carboxylic acids which preferably contain hydroxyl groups and have 2–20 carbon atoms, for example calcium stearate, calcium ricinoleate, calcium propionate, calcium lactate and calcium citrate.

A wide variety of nitrogen-containing protective agents against thermal degradation of the POM may be employed in the practice of this invention. Suitable amidine compounds (i.e., a compound containing a carbon atom doubly bonded to one nitrogen compound and singly bonded to another) include the cyano-guanidine compounds such as cyano-guanidine itself (dicyandiamide) and other compounds containing the divalent 1-cyano-3,3 guanidine radical.

Amine substituted triazines constitute another suitable class of amidine compounds. The preferred compounds of this class are amine substituted derivatives of symmetrical triazines, including guanamines (2,4-diamino-sym.-triazines), melamines (2,4,6-triamino-sym.-triazine), and substituted melamines.

Other suitable nitrogen-containing protective agents against thermal degradation of the POM include, for example, polyamides produced by the ternary polymerization of caprolactam, hexamethylene diamine adipate and hexamethylene diamine sebacate, such as those marketed by the E. I. DuPont de Nemours Company of Delaware, U.S.A., under the trade name Elvamide.

The amount of nitrogen-containing stabilizer used will vary depending upon the particular acetal polymer used and the degree of stability desired.

Further protective agents against thermal degradation of the POM include antioxidants, such as hindered phenols, for example components commercially available from Ciba Geigy AG under the trademarks "Irganox 245", "Irganox 259", "Irganox 1010", "Irganox 1076" or "Irganox 1098".

Examples of suitable protective agent against degradation by ultra-violet light, referred to in the parent application as "light stabilizers for POM", are α-hydroxybenzophenone derivatives and benzotriazole derivatives.

Suitable lubricants include waxes such as long chain amide waxes, long chain ester waxes or partly saponified ester waxes, oils and polyether glycidol.

Finally, there may be added to the inventive compositions, a nucleant or nucleating agent, such as talc, other finely divided silicates, powdered sulfates or carbonates, or a terpolymer of trioxane, ethylene oxide and butanediol diglycidyl ether.

Generally speaking, but not necessarily or mandatory, the POM-components of the present invention include from 0 to about 2% by weight of hindered phenol as an antioxidant; from 0 to about 0.3% by weight of an alkaline earth metal carboxylate salt; from 0 to about 1% by weight of a lubricant; from 0 to about 2% by weight of a nucleant; and from 0 to 2% by weight of a nitrogen containing stabilizer compound.

More typically, but not necessarily or mandatory, the POM-components include from about 0.2 to about 1% by weight of hindered phenol; from 0 to about 0.15% by weight of an alkaline earth metal carboxylate salt; from about 0.1 to about 0.5% by weight of a lubricant; from 0 to about 1% by weight of a nucleant; and from about 0.005 to about 1.5% by weight of a nitrogen containing stabilizer compound.

Component B: Specially Stabilized Core Shell Graft

An essential characteristic of the improved POM composition according to the invention is the content of component B, a specially stabilized core shell graft copolymer, the amount of which is, in general between 5 and 50% by weight, preferably between about 10 and about 40% by weight and particularly between about 10 and about 30% by weight. The component B is a specially stabilized MBS (methacrylatebutadiene-styrene) core shell graft copolymer. The rubbery core is polybutadiene or poly(butadiene/styrene) with a poly(methyl methacrylate) or poly(methyl methacrylate/styrene) hard shell or shells which is grafted onto the rubber core by polymerizing styrene, methyl methacrylate or mixtures thereof in the presence of the rubber core. Amounts below 10% (of the styrene, methyl methacrylate or mixtures thereof) of other monomers such as ethyl acrylate, or crosslinking or graftlinking monomers, may also be formed into the polymers of the shell or shells. The MBS core shell graft copolymers of the present invention are made by well known techniques of emulsion polymerization. The special stabilizer formulation included in component B contains at least one hindered phenol, an organic phosphite, an organic sulfide, and a pH buffer system, such as disodium hydrogen phosphate, trisodium phosphate, a mixture of disodium hydrogen phosphate and trisodium phosphate, or a mixture of sodium hydroxide and phosphoric acid.

The hindered phenols useful in the present invention include octadecyl 3-(3',-5'-di-tert-butyl-4'-hydroxy phenyl) propionate, hexamethylene bis (3,5-di-tertiary-butyl-4-hydroxy hydrocinnamate), 1,1,3-tris(2'-methyl-5'-tert-butyl-4'-hydroxyphenyl)butane, 2,6-di-tert-butyl cresol, ethylene bis(oxyethylene) bis(3-tert-butyl-4-hydroxy-5-methylhydrocinnamate), and mixtures thereof. As seen by this exemplification, and as known to the skilled artisan, "hindered phenol" refers to a structure having at least one tertiary alkyl group adjacent (ortho) to the phenolic hydroxyl group, preferably the tertiary alkyl group being t-butyl, and preferably the other adjacent or ortho position being a tertiary-alkyl group. The hindered phenols may be used at levels of about 0.2 to about 1.5 weight percent, preferably about 0.4 to about 1.0 weight percent, of component B.

The organic phosphites of this invention include aliphatic and aromatic phosphites, such as tris(mononoylphenyl) phosphite, bisnonylphenyl pentaerythritol diphosphite, bis(2,4-di-tert-butylphenyl)pentaerythritol diphosphite, tris(2,4-di-tertbutylphenyl)phosphite, tris(mixed mono-or di-nonylphenyl)phosphite, and the like. As can be seen from the organic phosphites exemplified and as known to the skilled artisan, the phosphite will contain a —P—O-Aryl group, wherein Aryl is phenyl or alkyl-substituted phenyl. The organic phosphites may be used at levels of about 0.1 to about 0.8 weight percent, preferably about 0.2 to about 0.4 weight percent, of component B. The sulfides of this invention have one or more of the following sulfide groups:

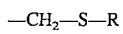

—CH$_2$—S—R wherein R is alkyl group of from 1 to 20 carbon atoms, and preferably 7 to 12 carbon atoms. The examples include: 2,4-bis[(octylthio)methyl]-o-cresol, pentaerythritol tetrakis (octyl thiopropionate), trimethylolpropane tris(octyl thiopropionate) and pentaerythritol tetrakis(β-lauryl thiopropionate), and the like. Sulfides where R is an alkyl alkanoate are not contemplated in this invention, and examples of these sulfides include: dilauryl thiodipropionate and dimyristyl thiodipropionate. The sulfides of this invention may be used at levels of about 0.25 to about 2.0 weight percent, preferably about 0.8 to about 1.6 weight percent, of component B. Stabilizers which contain more than one of the functionalities hindered phenol, organic sulfide, and organic phosphite are considered in this invention.

The pH buffer system of disodium hydrogen phosphate and trisodium phosphate is added to adjust the pH to the range of about 7 to about 11. Disodium hydrogen phosphate or trisodium phosphate may be added singularly to adjust the pH to the range of about 7 to about 11. In place of sodium salts, a pH buffer system of sodium hydroxide and phosphoric acid may be used to adjust the pH.

A surfactant may be included with the stabilizer to provide an emulsion of the stabilizer. Examples of surfactants suitable for use with the stabilizers of the invention include: sodium dodecylbenzene sulfonate and potassium oleate. The amount of the surfactant typically constitutes 5 to 25% by weight of the special stabilizer formulation depending on the specific properties of the surfactant. Besides the special stabilizer formulation, additional stabilizers may be added to component B, but the cost/benefit ratio decreases as more stabilizers are added, since costs will increase proportionally as more stabilizers are added to component B.

The inventors have found that the constituents of component B may be singularly added to POM (component A) to achieve the same result as the combination of POM (component A) and component B. By singularly is meant that the constituents of component B need not be combined together in a mixture of the constituents of Component B, but may be added separately. The order of addition of the singular components does not appear to be critical to the invention.

It should be noted that the MBS modifier requires an effective anti-oxidant to be present during its isolation by spray-drying or coagulation, regardless of the end use of the MBS modifier, and by use of the specific hindered phenols of the present invention, the MBS modifier may be isolated safely, as well as containing in an admixed form the specific hindered phenols which are specific to component B. For this reason, it is not contemplated to add all of the constituents of component B singularly to component A.

For example, an MBS core shell graft copolymer (containing two hindered phenols such as 1,1,3-tris(2'-methyl-5'-tert-butyl-4'-hydroxyphenyl)butane and 2,6-di-tert-butyl cresol and an organic phosphite, wherein the hindered phenols and the phosphite are present at the time of isolation of the MBS graft copolymer), a sulfide, and a pH buffer system may be added as three singular constituents to POM to get the same excellent low-temperature impact strength and good heat aging performance results as combining POM (component A) and component B. Separation of the constituents of component B and combining them singularly with POM (component A), with the exception of the required pre-combination of the hindered phenols and the MBS, is viewed as embodiments of the invention, such that an improved polyacetal composition comprising polyoxymethylene (component A) and 5–50% by weight, relative to the total mixture of combinations such as: a) a sulfide, a MBS core shell graft copolymer containing one or more hindered phenols and a phosphite, and optionally, a pH buffer system, or b) a sulfide, a phosphite, a MBS core shell graft copolymer containing one or more hindered phenols, and optionally, a pH buffer system, or c) a sulfide, a MBS core shell graft copolymer containing one or more hindered phenols, a pH buffer system, and optionally, a phosphite, are contemplated by the inventors. Applicants have found that a pH buffer system may be optional when the phosphite and sulfide constituents of component B are singularly added to POM (component A) and pH buffering of the constituents of component B is not necessary. Further, Applicants have found that a phosphite may be optional when the sulfide and pH buffer constituents of component B are singularly added to POM (component A).

Other Components

It should be understood that the compositions of the present invention can include in addition to the polyacetal and the stabilized core shell graft copolymer, other additives, modifiers, fillers and ingredients, as are generally used in polyacetal molding resins.

If appropriate or desired, a polymeric third component may also be present, such as for example, thermoplastic polyurethanes, polyolefins, modified polyolefins, polyamides, polyacrylates, polyesters, polycarbonates or fluoropolymers, for improving other properties, for example, friction and wear properties, processing behavior, surface appearance (e.g., gloss), weatherability or manufacturing cost reduction (i.e. better economic cost to make).

Furthermore, the improved POM composition according to the invention can also contain customary fillers. The following are examples of these: filamentous reinforcing materials, such as glass fibers or carbon fibers; non-fibrous fillers, such as glass powder, graphite, carbon black, metal powders, metal oxides, silicates, carbonates and molybdenum (IV) sulfide. These fillers can be treated with an adhesion promoter or adhesion promoter system. If used, the amount of filler is up to 50% by weight, preferably 5 to 40% by weight, relative to the total mixture. Most preferably, the mixture according to the invention does not contain fillers.

In terms of the claims, the "total mixture" includes the polyoxymethylene and additives associated with it (Component A), the stabilized MBS modifier (Component B) or stabilizers separately combined with the MBS modifier, and finally other additives, such as filler. In this total mixture, the polyoxymethylene is always the predominant component, and is always more than 50% of the total mixture, preferably between about 90 and about 60% by weight and particularly between about 90 and about 70% by weight.

Preparation

The preparation of the improved POM composition according to the invention is effected by vigorously mixing the components at an elevated temperature, in general, at temperatures above the melting point of component A, that is to say at about 160° to 250° C., preferably between 180° and 220° C., in units having a good mixing action, such as, for example, mixing rolls, kneaders or preferably extruders, most preferably twin-screw extruders. It has been found that the size and distribution of the elastomer particles in the matrix has a considerable effect on the mechanical properties of the improved POM composition. The mixing of the components should, therefore, be effected in such a way that the component B is distributed as homogeneously as possible in the polymer matrix, and that the particle size of the particles of the component B in the improved POM composition according to the invention is within the range between 0.1 and 5 μm, preferably between 0.1 and 1 μm.

After melt mixing, the improved POM composition can be pelletized, chopped or ground to give granules, chips, flakes or powders.

The improved POM composition according to the invention is thermoplastic and thus accessible to all the processing procedures typical of thermoplastic compositions.

The improved POM composition can be processed by injection molding, extrusion, melt spinning or deep-drawing to give shaped articles of any desired kind, and is suitable as an industrial material for the production of semi-finished and finished components, for example tapes, rods, sheets, films, tubes and hoses and also parts of machines, for example, casings, gearwheels, snap fittings, bearing components and control elements, automobile parts especially under the hood parts such as clips, or interior accessories such as loud speaker grills and the like.

The following examples are presented to illustrate a few embodiments of the invention, but we do not intend the invention to be limited to the illustrated embodiments. All parts and percentages are by weight unless otherwise indicated.

EXAMPLES

The following parameters and tests are used in the examples to illustrate the present invention:

MFI 190/2.16: Melt flow index as specified in DIN 53.735 at 190° C., 2.16 kg.

MVI 190/15: Melt flow volume index as specified in DIN 53.735 at 190° C., 15 kg.

Weight loss under nitrogen ($N_2$), 240° C.: On 1.5 g pellets in an aluminum (Al) sample holder, in a thermobalance under nitrogen after one hour.

Weight loss under air, 230° C.: On 5.0 g pellets in an Al-pan of diameter of 5.5 cm in an oven under air, after 45 min. or 2 hours respectively.

Weight loss under air, 150° C.: On 2.5 g pellets in an Al-pan of diameter of 5.5 cm. in an oven under air after 64 hours.

$a_{kv}$: V-notched impact strength as specified in DIN 53.453 on a standardized small bar 50×6×4 mm with a v-notch of radius 1.0 mm, measured at 23° C. For heat aging at 100° C. in an oven under air the 50×6×4 mm-test samples were notched before aging.

Damaging energy, Ws: As specified in DIN 53.443 on 60×60×2 mm plaques, measured at 23° C. and at −40° C.

DSC Test: Tests are made in which the time to exotherm is measured. The time to exotherm is the time required to achieve the maximum exotherm rate as measured by differential scanning calorimetry (DSC), with a 15–20 milligram sample held at 190° C. in air. In the DSC test, the relative thermal stability is clearly demonstrated by the length of time to exotherm (exotherm providing an excellent indication of rapid degradation.)

Yellowness index, NG: As specified in DIN 6.167/ASTM D1925, before and after heat aging of the plaques at 100° C. or 150° C., respectively, in an oven under air.

The pH of the emulsion was tested using a convention pH meter, such as an Orion pH meter.

Preparation of the Improved POM Compositions

As illustrated below, component A and component B and optionally other components were mixed in a fluid-mixer and then fed into a twin screw extruder of the type Werner and Pfleiderer ZDSK 28, with a 1/d ratio of 28 and a kneading zone for an intimate mixing of the components in the melt. The melt temperature profile over the barrel of the extruder was 190°–220°–200° C. The melt strand was cooled with water and pelletized. The pellets were dried at 80° C. under vacuum for 24 hours. The pellets were injection molded in the customary way to the test specimens. The comparative examples and comparative test specimens were similarly prepared.

Example 1—Preparation of the MBS Polymer Latex

A stainless steel autoclave with an agitator and several entry ports was charged with 5 parts of a diphenyl oxide sulfonate emulsifier in 2688 parts of de-ionized water and 4.9 parts of sodium formaldehyde sulfoxylate and brought to pH of 4.

The autoclave was evacuated and 2297 parts of butadiene, 96.8 parts of styrene, 12 parts of cumene hydroperoxide, and 24.6 parts of divinyl benzene were added and caused to react at 70° C. over 9 hours. An additional 36.9 parts of emulsifier was also added. At the end of the reaction period no further pressure drop was observed, the residual pressure was vented.

To 4000 parts of the rubber latex having approximately 48% solids, as prepared above, were added 272 parts of styrene followed by 0.544 parts of sodium formaldehyde sulfoxylate dissolved in 416 parts of de-ionized water and 1.088 parts cumene hydroperoxide. One hour after completion of the exotherm, 280 parts of methyl methacrylate, 2.816 parts of butylene dimethacrylate, 0.28 parts of sodium formaldehyde sulfoxylate dissolved in 80 parts of de-ionized water, and 0.560 parts of cumene hydroperoxide were added and caused to react to completion. The resulting MBS Polymer Latex had approximately 49% solids.

Example 2—Preparation of the Stabilizer Formulation 7.83 parts of the ethylene bis(oxyethylene) bis(3-tert-butyl-4-hydroxy-5-methyl hydrocinnamate), 7.83 parts of tris(mononylphenyl) phosphite, and 23.52 parts of pentaerythritol tetrakis (β-lauryl thiopropionate) were charged to a reaction vessel while heating to 85° C. When the mixture began to melt (at approximately 70° C.), it was vigorously agitated to yield a homogeneous melt. 43.16 parts of 22.5% solution of sodium dodecyl benzene sulfonate were charged. The emulsion was agitated for 10 minutes, and 17.1 parts of de-ionized water were added to the emulsion. After an additional 15 minutes of mixing, the stabilizer emulsion was ready for addition to the MBS polymer latex of Example 1 as described in Example 3, below. The resulting Stabilizer Formulation had approximately 49% solids.

Example 3—Preparation of the Stabilized MBS Polymer Emulsion (component B)

4000 parts of MBS polymer latex as prepared in Example 1 were heated to 50° C. in a reaction vessel with agitation. 114.5 parts of 2.5% solution of sodium hydroxide and 100 parts of 2% solution of phosphoric acid were added to bring the pH to 7.5 to 8.0. The stabilizer emulsion prepared in Example 2 was then added. The resulting stabilized MBS polymer emulsion was agitated for 20 minutes at 50° C., then cooled to less than 40° C. The stabilized MBS polymer was isolated by spray drying, but can be isolated by other methods such as freeze drying and coagulation. The resulting Stabilized MBS Polymer Emulsion had approximately 48% polymer solids. After isolation, the resulting MBS Polymer contains 0.4% of ethylene bis(oxyethylene) bis(3-tert-butyl-4-hydroxy-5-methyl hydrocinnamate), 0.4% of tris(mononylphenyl) phosphite, and 1.2% of pentaerythritol tetrakis (β-lauryl thiopropionate).

Comparative Examples 4A, 4B, 4C and 4D and Example 4—Comparison of Impact Strength, Thermal Stability in the Melt and Color Stability of Various Stabilized MBS Modifiers in POM Composition Below is a comparison of impact strength (notched Charpy), before and after heat aging, thermal stability in the melt (weight loss) and color stability (change in yellowness) in a POM composition using various stabilized MBS modifiers.

TABLE I

| Example Number and Composition (75% POM + 25% MBS(#)) (% - weight percent) | Impact Strength- Notched Charpy-as molded [mJ/mm²] | Impact Strength- Notched Charpy-Heat Aged 1000 hrs at 100° C. [mJ/mm²] | Thermal Stability in the Melt Weight Loss N₂, 240° C., 1 h [%] | Thermal Stability in the Melt Weight Loss air, 230° C., 2 h [%] | Color Stability Change in Yellowness Index/Heat Aging 6 h/150° C. |
|---|---|---|---|---|---|
| Comp. Ex. 4A POM + MBS (1) | 38 | 15 | 0.9 | 19.2 | 37 |
| Comp. Ex. 4B POM + MBS (2) | 19 | 12 | 0.3 | 15.3 | 21 |
| Comp. Ex. 4C POM + MBS (3) | 27 | 13 | 0.8 | 13.7 | 23 |
| Comp. Ex. 4D POM + MBS (4) | 50 | 35 | 1.5 | 54.1 | 19 |
| Example 4 POM + MBS (5) | 48 | 40 | 1.3 | 25.4 | 14 |

Comparative Examples 4A, 4B, 4C and 4D

MBS (1): MBS of Example 1 stabilized with: (a) 0.4% of 2,6-di-tert-butyl cresol, (b) 0.13% of 1,1,3-tris(2'-methyl-5' tert-butyl-4'-hydroxyphenyl)butane, and (c) 0.4% of tris(mixed mono- or di-nonylphenyl)phosphite. Comparative to component B.

MBS (2): MBS of Example 1 stabilized with: (a) 1.4% of octadecyl 3,5-di-tert-butyl-4-hydroxyhydrocinnamate, and (b) 0.4% of tris(mono-nonylphenyl)phosphite. Comparative to component B.

MBS (3): MBS of Example 1 stabilized with: (a) 1.4% of octadecyl 3,5-di-tert-butyl-4-hydroxyhydrocinnamate, and (b) 0.4% of 1,1,3-tris(2'-methyl-5' tert-butyl-4'-hydroxyphenyl)butane Comparative to component B.

MBS (4): MBS of Example 1, with pH raised to 7.5 using 2.5% sodium hydroxide solution and 2% phosphoric acid solution in the amounts shown in Example 3, stabilized with: (a) 0.4% ethylene bis(oxyethylene) bis(3-tert-butyl-4-hydroxy-5-methyl hydrocinnamate), (b) 0.4% of tris-(mixed mono- or dinonylphenyl)phosphite, and (c) 1.2% of dilauryl thiodipropionate. Comparative to component B.

POM: Hostaform C 9021: POM-Copolymer formed from trioxane and approx. 2% by weight of ethylene oxide, available from Hoechst AG, Frankfurt am Main, Germany, under the trademark Hostaform C 9021, containing the customary protective agents against thermal degradation of the POM and additives, MFI 190/2.16 is approximately 9 (Component A).

Example 4

MBS (5): Stabilized MBS of Example 3 (component B).
POM: Hostaform C 9021—available from Hoechst AG, Frankfurt am Main, Germany (component A).
Note: The weight percentage (25%) of the MBS Modifier in Example 4 and Comparative Examples 4A, 4B, 4C and 4D, is based on the polymer solids.

Comparative Examples 5–16

Comparison of Comparative Examples 5–16 (Table II) to Examples 5–14 (Table III) illustrate that the stabilized MBS Modifier (component B) of this invention provides improved properties in POM in comparison to other stabilized MBS modifiers.

Comparative Examples 5–11

Component A:
POM: Hostaform C 9021.
Comparative-Component B:
MBS core shell rubber elastic graft copolymer with a polybutadiene core and a methyl methacrylate/styrene shell (MBS (1) of Comparative Example 4A).

Comparative Examples 12 and 13

Component A:
POM-Copolymer formed from trioxane and approx. 3% by weight of butanediolformal, available from BASF AG, Ludwigshafen, Germany, under the trademark Ultraform N 2320, containing the customary protective agents against thermal degradation of the POM and additives, MFI 190/2.16 is approximately 9.
Comparative-Component B MBS core shell rubber elastic graft copolymer with a polybutadiene core and a methyl methacrylate/styrene shell (MBS (1) of Comparative Example 4A).

Comparative Example 14

Component A:
POM-Homopolymer formed from formaldehyde, available from E. I. DuPont de Nemours, Bad Homburg, Germany, under the trademark Delrin 500, containing customary protective agents against thermal degradation of the POM and additives, MFI 190/2.16 is approximately 10.
Comparative-Component B
MBS core shell rubber elastic graft copolymer with a polybutadiene core and a methyl methacrylate/styrene shell (MBS (1) of Comparative Example 4A).

Comparative Examples 15 and 16

Component A:
POM-Copolymer formed from trioxane and approx. 2% by weight of ethylene oxide, available from Hoechst AG, Frankfurt am Main, Germany, under the trademark Hostaform C 9021, containing the customary protective agents against thermal degradation of the POM and additives, MFI 190/2.16 is approximately 9.
Comparison-Component B
MBS core shell rubber elastic graft copolymer with a polybutadiene core and a methyl methacrylate/styrene shell (MBS (1) of Comparative Example 4A).

Comparative Examples 8, 9, 13, 15 and 16

By the further addition of stabilizers to the stabilized MBS modifiers in Comparative Examples 8, 9, and 13, heat aging properties were not improved to a satisfactory extent by the addition of: (1) Irganox 1010 (Pentaerythritol-tetrakis [3-(3,5-di-t-butyl-4-hydroxyphenyl)propionate] commercially available from Ciba-Geigy AG, Basel, Switzerland), or (2) Hostanox PAR 24 (Tri(2,4-di-tert.-butylphenyl)phosphite commercially available from Hoechst AG, Frankfurt am Main, Germany). In Comparative Examples 15 and 16, the thermostability in the melt deteriorated by an unacceptable extent by adding Irganox PS 800 (Dilauryl thiodipropionate commercially available from Ciba-Geigy AG, Basel, Switzerland).

Examples 5–11

Component A
POM-Copolymer formed from trioxane and approx. 2% by weight of ethylene oxide, available from Hoechst AG, Frankfurt am Main, Germany, under the trademark Hostaform C 9021, containing the customary protective agents against thermal degradation of the POM and additives, MFI 190/2.16 is approximately 9.
Component B
4000 gms of MBS polymer latex of Example 1, 130.7 gms of 2.5% sodium hydroxide, 120 gms of 2% phosphoric acid and stabilizer formulation of Example 2.

Examples 12 and 13

POM-Copolymer formed from trioxane and approx. 3% by weight of butanediolformal, available from BASF AG, Ludwigshafen, Germany, under the trademark Ultraform N 2320, containing the customary protective agents against thermal degradation of the POM and additives, MFI 190/2.16 is approximately 9.

Component B: Same as Component B of Examples 5–11.

Example 14

POM-Homopolymer formed from formaldehyde, available from E. I. DuPont de Nemours, Bad Homburg, Germany, under the trademark Delrin 500, containing the customary protective agents against thermal degradation of the POM and additives, MFI 190/2.16 is approximately 10.
Component B: Same as Component B of Examples 5–13.

Examples 8, 9 and 13

In these examples, stabilizers such as Irganox 1010 (pentaerythritol-tetrakis [3-(3,5-di-t-butyl-4-hydroxyphenyl)propionate] commercially available from Ciba-Geigy AG, Basel, Switzerland) or Hostanox PAR 24 (Tri(2,4-di-tert.-butylphenyl)phosphite commercially available from Hoechst AG, Frankfurt am Main, Germany) were added to the stabilized MBS modifiers. The addition of these stabilizers show no significant improvement in properties of Examples 8, 9 over Example 7, or Example 13 over Example 12 (Table III). No significant improvement is seen by the use of additional stabilizers.

TABLE II

Results of Comparative Examples 5–16

| Comparative Example Number | Composition % POM/% MBS | MVI 190° C. 15 kg [cm$^3$/10 min] | Damaging Energy 23° C. [J] | Damaging Energy −40° C. [J] | Weight Loss air, 230° C., 45 min [%] | Weight Loss air, 150° C., 64 h [%] | Yellowness Index before heat aging | Yellowness index after heat aging 1000 h at 100° C. | akv before heat aging [mJ/mm$^2$] | akv after heat aging 1000 h at 100° C. [mJ/mm$^2$] |
|---|---|---|---|---|---|---|---|---|---|---|
| Comp. Example 5 | Comp. A - 90% Hostaform C 9021 Comp B - 10% MBS(1) | 59.1 | 12.1 | 2.2 | 1.3 | 0.6 | 1.5 | 43.1 | 15.3 | 10.6 |
| Comp. Example 6 | Comp. A - 80% Hostaform C 9021 Comp B - 20% MBS(1) | 49.2 | 18.7 | 4.4 | 3.5 | 0.6 | 1.3 | 55.6 | 33.7 | 18.5 |
| Comp. Example 7 | Comp A - 75% Hostaform C 9021 Comp B - 25% MBS(1) | 39.0 | 25.2 | 6.4 | 4.6 | 0.7 | 1.4 | 58.3 | 40.2 | 19.2 |
| Comp. Example 8 | Comp. A - 74.3% Hostaform C 9021 0.7% Irganox 1010 Comp. B - 25% MBS(1) | 38.0 | 23.8 | 5.1 | 4.0 | 0.5 | 1.7 | 46.2 | 41.1 | 25.3 |
| Comp. Example 9 | Comp. A - 74.5% Hostaform C 9021 0.5% Hostanox PAR 24 Comp. B 25% MBS(1) | 38.5 | 24.7 | 5.3 | 4.1 | 0.6 | 2.1 | 49.4 | 39.3 | 22.6 |
| Comp. Example 10 | Comp. A - 70% Hostaform C 9021 Comp. B - 30% MBS(1) | 32.8 | 27.3 | 7.6 | 5.4 | 0.7 | 1.6 | 66.8 | 46.4 | 20.4 |
| Comp. Example 11 | Comp. A - 60% Hostaform C 9021 Comp. B - 40% MBS(1) | 19.3 | 29.4 | 8.7 | 9.6 | 0.9 | 1.9 | 79.7 | not broken | 18.2 |
| Comp. Example 12 | Comp. A - 75% Ultraform N 2320 Comp. B - 25% MBS(1) | 36.8 | 25.1 | 6.2 | 14.2 | 0.5 | 3.7 | 29.9 | 41.3 | 19.8 |
| Comp. Example 13 | Comp. A - 74% Ultraform N 2320 1.0% Irganox 1010 Comp. B - | 34.8 | 23.8 | 5.6 | 16.5 | 0.8 | 3.9 | 26.3 | 40.7 | 22.7 |

TABLE II-continued

Results of Comparative Examples 5–16

| Comparative Example Number | Composition % POM/% MBS | MVI 190° C. 15 kg [cm³/10 min] | Damaging Energy 23° C. [J] | Damaging Energy −40° C. [J] | Weight Loss air, 230° C., 45 min [%] | Weight Loss air, 150° C., 64 h [%] | Yellowness Index before heat aging | Yellowness index after heat aging 1000 h at 100° C. | akv before heat aging [mJ/mm²] | akv after heat aging 1000 h at 100° C. [mJ/mm²] |
|---|---|---|---|---|---|---|---|---|---|---|
| Comp. Example 14 | 25% MBS(1) Comp. A 75% Delrin 500 Comp. B 25% MBS(1) | 50.0 | 21.2 | 4.8 | 30.9 | 28.9 | 8.3 | 65.4 | 33.6 | 14.4 |
| Comp. Example 15 | Comp. A - 74.8% Hostaform C 9021 0.2% Irganox PS 800 Comp. B - 25% MBS(1) | 38.7 | 24.8 | 5.5 | 25.4 | 0.4 | 3.8 | 12.4 | 40.8 | 26.8 |
| Comp. Example 16 | Comp. A - 74.5% Hostaform C 9021 0.5% Irganox PS 800 Comp. B - 25% MBS(1) | 38.9 | 24.0 | 5.3 | 28.4 | 0.4 | 4.1 | 10.5 | 39.4 | 27.3 |

TABLE III

Results of Examples 5–14

| Example Number | Composition | MVI 190° C. 15 kg [cm³/10 min] | Damaging Energy 23° C. [J] | Damaging Energy −40° C. [J] | Weight Loss air, 230° C., 45 min [%] | Weight Loss air, 150° C., 64 h [%] | Yellowness Index before heat aging | Yellowness index after heat aging 1000 h at 100° C. | akv before heat aging [mJ/mm²] | akv after heat aging 1000 h at 100° C. [mJ/mm²] |
|---|---|---|---|---|---|---|---|---|---|---|
| Example 5 | Comp. A - 90% Hostaform C 9021 Comp B - 10%* | 67.4 | 11.8 | 2.4 | 2.1 | 0.3 | 1.8 | 3.5 | 16.2 | 14.7 |
| Example 6 | Comp. A - 80% Hostaform C 9021 Comp. B - 20%* | 49.4 | 21.0 | 4.7 | 3.2 | 0.3 | 1.4 | 3.9 | 35.2 | 29.4 |
| Example 7 | Comp. A - 75% Hostaform C 9021 Comp. B - 25%* | 40.5 | 26.2 | 5.8 | 3.7 | 0.3 | 1.4 | 4.1 | 50.8 | 40.1 |
| Example 8 | Comp. A - 74.3% Hostaform C 9021 0.7% Irganox 1010 Comp. B - 25%* | 42.0 | 27.3 | 6.2 | 3.0 | 0.3 | 1.8 | 3.9 | 48.6 | 41.2 |
| Example 9 | Comp. A - 74.5% Hostaform C 9021 0.5% Hostanox PAR 24 Comp. B - 25%* | 38.2 | 24.3 | 4.8 | 3.3 | 0.4 | 2.3 | 4.5 | 46.3 | 33.1 |
| Example 10 | Comp. A - 70% Hostaform C 9021 Comp. B - 30%* | 35.5 | 28.1 | 8.3 | 5.0 | 0.3 | 1.8 | 4.3 | not broken | 43.3 |
| Example | Comp. A - | 22.3 | 31.3 | 9.4 | 4.9 | 0.4 | 2.1 | 4.7 | not | 41.5 |

TABLE III-continued

Results of Examples 5–14

| Example Number | Composition | MVI 190° C. 15 kg [cm³/10 min] | Damaging Energy 23° C. [J] | Damaging Energy –40° C. [J] | Weight Loss air, 230° C., 45 min [%] | Weight Loss air, 150° C., 64 h [%] | Yellowness Index before heat aging | Yellowness index after heat aging 1000 h at 100° C. | akv before heat aging [mJ/mm²] | akv after heat aging 1000 h at 100° C. [mJ/mm²] |
|---|---|---|---|---|---|---|---|---|---|---|
| 11 | 60% Hostaform C 9021 Comp. B 40%* | | | | | | | | broken | |
| Example 12 | Comp. A - 75% Ultraform N 2320 Comp. B - 25%* | 38.7 | 23.8 | 5.7 | 6.8 | 0.3 | 3.5 | 5.2 | 45.8 | 38.4 |
| Example 13 | Comp. A - 74% Ultraform N 2320 1.0% Irganox 1010 Comp. B - 25%* | 40.0 | 26.3 | 6.7 | 6.0 | 0.3 | 3.9 | 5.0 | 44.9 | 39.6 |
| Example 14 | Comp. A 75% Delrin 500 Comp. B 25%* | 50.6 | 24.5 | 4.9 | 28.7 | 0.9 | 7.8 | 11.2 | 39.4 | 25.7 |

* = Component B of Examples 5–11 (as earlier taught herein).

Comparative Examples 17–19 and Examples 17–22: DSC Thermal Stability of Component B (Stabilized MBS Modifier): Effect of Sodium Hydroxide/Phosphoric Acid (pH Buffer) Addition Examples 17–22 illustrate that the MBS polymer latex of Example 1, when stabilized and pH buffered by sodium hydroxide and phosphoric acid as described herein, results in a thermally stable MBS Modifier, when compared to the stabilizer packages of Comparative Examples 17–19.

The sulfides, especially those claimed in this invention, are good stabilizers for MBS polymers. The use of these sulfides have a deleterious effect on thermal stability of the melt and therefore, adversely affects the processability of the resin. The Applicants' use of the pH buffers improves the thermal stability of the melt.

We claim:

1. An improved polyacetal composition comprising more than 50 weight % of the total mixture as polyoxymethylene (component A) and 10–40 weight %, relative to the total mixture, of:
   (a) a stabilized MBS core shell graft copolymer comprising a rubber-elastic core of polybutadiene or poly(butadiene/styrene), a hard graft shell, and a stabilizer

TABLE IV

| Example Number and MBS polymer latex | Stabilizer Package | 2.5% Sodium Hydroxide [g/4000 g of polymer emulsion] | 2% Phosphoric Acid [gms] | DSC @ 190° C. Time 50 Exotherm [minutes] |
|---|---|---|---|---|
| Comp. Ex. 17 MBS of Ex. 1 | MBS (4) | 0 | 0 | 12 |
| Comp. Ex. 18 MBS of Ex. 1 | MBS (4) | 56.8 | 49.7 | 11 |
| Comp. Ex. 19 MBS of Ex. 1 | MBS (4) | 113.5 | 99.1 | 2 |
| Example 17 MBS of Ex. 1 | Example 2 | 0 | 0 | 47 |
| Example 18 MBS of Ex. 1 | Example 2 | 56.8 | 49.7 | 159 |
| Example 19 MBS of Ex. 1 | Example 2 | 113.5 | 99.1 | 191 |
| Example 20 MBS of Ex. 1 | 13S | 0 | 0 | 51 |
| Example 21 MBS of Ex. 1 | 13S | 56.8 | 49.7 | 280 |
| Example 22 MBS of Ex. 1 | 13S | 113.5 | 99.1 | 296 |

13S: Stabilizer package of Example 2 except pentaerythritol tetrakis (β-lauryl thiopropionate) was replaced with 2,4-bis[(octylthio)methyl]-o-cresol.

Sulfide and the Use of pH Buffer formulation composed of one or more hindered phenols, an organic phosphite, an organic sulfide and a pH buffer system in the range of about 7 to about 11 (component B), or (b) a combination of (i) an organic sulfide, (ii) a MBS core shell graft copolymer comprising a rubber-elastic core of polybutadiene or poly(butadiene/styrene) and a hard graft shell, and containing one or more hindered phenols and an organic phosphite, and, optionally, (iii) a pH buffer system in the range of about 7 to about 11, the organic sulfide, the MBS core-shell polymer of (b)(ii), and the pH buffer system being added singularly, or (c) a combination of (i) an organic sulfide, (ii) a MBS core shell graft copolymer comprising a rubber-elastic core of polybutadiene or poly(butadiene/styrene), and a hard graft shell, and containing one or more hindered phenols, and (iii) at least one of an organic phosphite or a pH buffer system, the organic sulfide, the MBS core-shell polymer of (c)(ii), and the at least one of an organic phosphite or a pH buffer system being added singularly;

wherein the organic sulfide contains one or more of the group —$CH_2$—S—R, wherein R is an alkyl group of from 1 to 20 carbon atoms;

and wherein at least one hard graft shell is a polymer of methyl methacrylate or a copolymer of methyl methacrylate and styrene.

2. The improved polyacetal composition as claimed in claim 1 wherein the hard graft shell of the MBS core shell graft copolymer is a polymer of methyl methacrylate.

3. The improved polyacetal composition as claimed in claim 1 wherein the hard graft shell of the MBS core shell graft copolymer is a copolymer of methyl methacrylate and styrene.

4. The improved polyacetal composition as claimed in claim 1 wherein the pH buffer system in the range of about 7 to about 11 comprises disodium hydrogen phosphate and trisodium phosphate.

5. The improved polyacetal composition as claimed in claim 1, wherein the organic sulfide is 2,4-bis((octylthio)methyl)-o-cresol, pentaerythritol tetrakis (octylthiopropionate), trimethylolpropane tris(octylthiopropionate) or pentaerythritol tetrakis($\beta$-lauryl thiopropionate).

6. The improved polyacetal composition as claimed in claim 1 wherein the polyoxymethylene is a copolymer containing about 80 to about 99.9% by weight oxymethylene (—O—$CH_2$—) units interspersed with about 0.1 to about 20% by weight of —O—R'—units wherein R' is a divalent radical containing at least two carbon atoms directly linked to each other.

7. The improved polyacetal composition as claimed in claim 6 wherein the polyoxymethylene is a copolymer made up of oxymethylene and oxyethylene groups.

8. The improved polyacetal composition as claimed in claim 6 wherein the polyoxymethylene is a copolymer made up of oxymethylene and oxybutylene groups.

9. The improved polyacetal composition as claimed in claim 1 wherein the values of reduced specific viscosity (RSV values) of the polyoxymethylene are 0.3 to 2.0 dl/g, (measured in butyrolactone, stabilized with 2% by weight of diphenylamine, at 140° C. in a concentration of 0.5 g/100 ml) and the melt flow index values (MFI 190/2.16) are 0.02 to 50 g/min.

10. The improved polyacetal composition as claimed in claim 1 wherein the crystalline melting point of the polyoxymethylene is within the range from 140° to 180° C., and its density is 1.38–1.45 g/ml.

11. The improved polyacetal composition as claimed in claim 1 wherein component A additionally contains one or more additives, in the form of a protective agent against thermal degradation of the polyacetal, nucleating agent, antistatic agent, protective agent against degradation by ultra-violet light, flame-retarding agent, strip agent, lubricant, plasticizer, pigment, dyestuff, optical brightener or processing aid.

12. The improved polyacetal composition as claimed in claim 11 wherein the protective agent against degradation by ultra-violet light is an $\alpha$-hydroxybenzophenone derivative or benzotriazole derivative.

13. An improved polyacetal composition as claimed in claim 11 wherein the lubricant is a long chain amide wax, long chain ester wax or partly saponified ester wax, oil or polyether glycidol.

14. A shaped article produced from the improved polyacetal composition as claimed in claim 1.

15. An improved polyacetal composition comprising more than 50 weight % of the total mixture as polyoxymethylene (component A) and 10–40 weight %, relative to the total mixture, of:

(a) a stabilized MBS core shell graft copolymer comprising a rubber-elastic core of polybutadiene or poly(butadiene/styrene), a hard graft shell, and a stabilizer formulation composed of one or more hindered phenols, an organic phosphite, an organic sulfide and a pH buffer system in the range of about 7 to about 11 (component B), or (b) a combination of (i) an organic sulfide, (ii) a MBS core shell graft copolymer comprising a rubber-elastic core of polybutadiene or poly(butadiene/styrene) and a hard graft shell, and containing one or more hindered phenols and an organic phosphite, and, optionally, (iii) a pH buffer system in the range of about 7 to about 11, the organic sulfide, the MBS core-shell polymer of (b)(ii), and the pH buffer system being added singularly, or (c) a combination of (i) an organic sulfide, (ii) a MBS core shell graft copolymer comprising a rubber-elastic core of polybutadiene or poly(butadiene/styrene), and a hard graft shell, and containing one or more hindered phenols, and (iii) at least one of an organic phosphite or a pH buffer system, the organic sulfide, the MBS core-shell polymer of (c)(ii), and the at least one of an organic phosphite or a pH buffer system being added singularly;

wherein the organic sulfide contains one or more of the group —$CH_2$—S—R, wherein R is an alkyl group of from 1 to 20 carbon atoms;

wherein at least one hard graft shell is a polymer of methyl methacrylate or a copolymer of methyl methacrylate and styrene;

and wherein the amount of the organic sulfide is from 0.25 weight % to 2.0 weight %, the amount of the organic phosphite, if present, is from 0.1 weight % to 0.8 weight %, and the amount of the at least one hindered phenol is from 0.2 weight % to 1.5 weight %, all percentages being based on the combined weight of the MBS core shell graft copolymer, the hindered phenol, the phosphite, the sulfide and, if present, the pH buffer system.

16. The composition of claim 15, wherein the amount of the sulfide is from 0.80 weight % to 1.6 weight %, the amount of the phosphite, if present, is from 0.2 weight % to 0.4 weight %, and the amount of the at least one hindered phenol is from 0.4 weight % to 1.0 weight %.

* * * * *